United States Patent

Simon Bacardit

[11] Patent Number: 6,082,109
[45] Date of Patent: Jul. 4, 2000

[54] MASTER CYLINDER WITH DYNAMIC HYDRAULIC REACTION AND FLOATING PISTON

[75] Inventor: Juan Simon Bacardit, Drancy, France

[73] Assignee: Bosch Sistemas de Frenado, S.L., Barcelona, Spain

[21] Appl. No.: 09/117,413

[22] PCT Filed: Jun. 24, 1998

[86] PCT No.: PCT/FR98/01326

§ 371 Date: Jun. 24, 1998

§ 102(e) Date: Jun. 24, 1998

[87] PCT Pub. No.: WO99/00285

PCT Pub. Date: Jan. 7, 1999

[30] Foreign Application Priority Data

Jun. 27, 1997 [FR] France ................................. 9708124

[51] Int. Cl.[7] ........................................................ B60T 13/20
[52] U.S. Cl. ............................................................... 60/553
[58] Field of Search ................................. 60/552, 553, 574

[56] References Cited

U.S. PATENT DOCUMENTS 2,959,011 11/1960 Randol ....................................... 60/533
3,387,455 6/1968 Eggstein ..................................... 60/533
5,921,084 7/1999 Gautier et al. ............................. 60/533

*Primary Examiner*—F. Daniel Lopez
*Attorney, Agent, or Firm*—Leo H McCormick, Jr.; Warren Comsbock

[57] ABSTRACT

A master cylinder with a main piston (12) located in a main bore (110) of a body (11). A reaction arrangement including a reaction piston (3) which slides in a secondary bore (120) in the main piston (12) for providing a reaction to a pneumatic booster. The reaction arrangement includes a shut-off seat (31) associated with the reaction piston (3), an annular wall (4) located in the secondary bore (120) at a distance from the reaction piston (3), a ratio change-piston (5) located in a leaktight sliding in a central passage of the annular wall (4) and a floating piston (6) mounted in a leaktight sliding within the ratio change piston (5) for providing the reaction piston (3) with a reaction force when an actuation force is applied to quickly to the reaction piston (3).

4 Claims, 2 Drawing Sheets

MASTER CYLINDER WITH DYNAMIC HYDRAULIC REACTION AND FLOATING PISTON

The present invention relates to a master cylinder with hydraulic reaction for a pneumatic brake booster, comprising: a body pierced with a main bore; a cylindrical main piston pierced with a stepped secondary bore, and of which one end, outside the body, can receive a boost force directed in a first direction, this main piston being mounted, without leaking, in the main bore in order therein to delimit a working chamber which during operation is subjected to a hydraulic pressure; and hydraulic reaction means including a reaction piston mounted with leaktight sliding in a cross section of a first diameter of the secondary bore which it closes off, and having an end outside the body, capable of receiving an actuating force directed in the first direction; relative to the actuating force, the boost force having a delay that increases with the rate of application of the actuating force.

BACKGROUND OF THE INVENTION

A master cylinder of this type is described, for example, in patent FR-2,724,354.

Devices of this type have been developed very recently for their ability to overcome the dynamic shortcomings of pneumatic brake boosters.

Now it is known that pneumatic brake boosters which are used to provide a force to assist with braking which is added to the actuating force exerted by the driver on the brake pedal and is in theory proportional to this force, have the shortcoming of being able to develop this boost force only after a certain delay from the application of the actuating force.

As the boost force is the result of the difference between the pneumatic pressures which there are on the one hand in a front chamber of the booster, this chamber being connected to a source of partial vacuum, and on the other hand in a rear chamber which is connected to atmosphere during braking, and as the delay in boost force compared with the actuating force is due to a limit on the rate at which atmospheric air is let into the rear chamber through the booster inlet valve at the time of braking, this delay is longer, the more abrupt the braking.

Now, the situations in which braking is rapid are generally emergency situations in which the driver would, by contrast, specifically need the greatest possible boost force as early as possible.

These considerations have quite recently led to the development of master cylinders with hydraulic reaction which, on the one hand, allow the booster inlet valve to open wider and therefore allow an increased air flow rate and, on the other hand, allow a dynamic modulation of the reaction force, that is to say a modulation as a function of the rate of brake application of the fraction of the boost force with which the reaction master cylinder opposes the actuating force in order to adjust the boost force as a function of this actuating force.

Using devices described in documents which have not been pre-published, it is thus possible considerably to reduce the reaction force in the event of emergency braking as compared with the value it would have for normal braking, and this allows a corresponding increase in the braking force available for emergency braking situations.

However, a problem still encountered in this development lies in the relative structural complexity of devices capable of fulfilling these functions, and especially the difficulty in obtaining a dynamic variation of the reaction force using a reaction piston made as just one part.

The object of the present invention is to propose a solution to this problem.

SUMMARY OF THE INVENTION

To this end, the master cylinder of the invention which in other respects is in accordance with the preamble above, is essentially characterized in that the hydraulic reaction means further comprise: a shut-off seat mounted on a front face of the reaction piston and pointing toward the working chamber; an annular wall arranged some distance from the reaction piston in the first direction, forming a fixed restriction for the secondary bore and delimiting a central passage which has a second diameter smaller than the first diameter and which makes the cross section of first diameter of the secondary bore communicate with the working chamber; a ratio-change piston which is tubular, open to the working chamber and has a downstream external cross section which passes with leaktight sliding through the central passage of the annular wall and has a first retaining stop cooperating with the annular wall on the same side as the working chamber, this ratio-change piston being pushed back by a first spring some distance from the shut-off seat from which it is separated when the master cylinder is in a condition of rest, and by which it is closed off when the master cylinder is actuated quickly; and an annular floating piston mounted with leaktight sliding in the cross section of first diameter of the secondary bore and around an upstream external cross section of the ratio-change piston, this floating piston, together with the annular wall, delimiting a low-pressure annular chamber in which there is housed a second spring that urges the floating piston in a second direction, the opposite of the first direction, toward the reaction piston and toward a second stop of the ratio-change piston.

In the most reliable configuration, the ratio-change piston is mounted with non-leaktight sliding in a blind housing of the reaction piston.

It is moreover possible to contrive for the response curve of the booster equipped with the master cylinder of the invention to have, as is conventionally the case, an initial jump, by ensuring that this master cylinder with hydraulic reaction comprises a third spring urging a moving ring in the first direction against an internal rest in the secondary bore, and for the reaction piston to have a shoulder capable of driving the ring along when it is shifted, from a position of rest, in the second direction.

Finally, it is also possible to contrive for the response curve of the booster equipped with the master cylinder of the invention to have the same shape upon braking and subsequent brake release by contriving for the master cylinder to comprise a fourth spring urging the first retaining stop in the second direction, and for the downstream external cross section and the upstream external cross section of the ratio-change piston to have different respective diameters, the diameter of the downstream cross section being smaller than the diameter of the upstream cross section.

Other features and advantages of the invention will emerge clearly from the description thereof which is given hereafter by way of non-limiting indication, with reference to the appended drawings.

DETAILED DESCRIPTION OF THE INVENTION

As indicated earlier, the invention relates to a master cylinder with hydraulic reaction 1 intended to equip a pneumatic brake booster 2.

Figure 1:
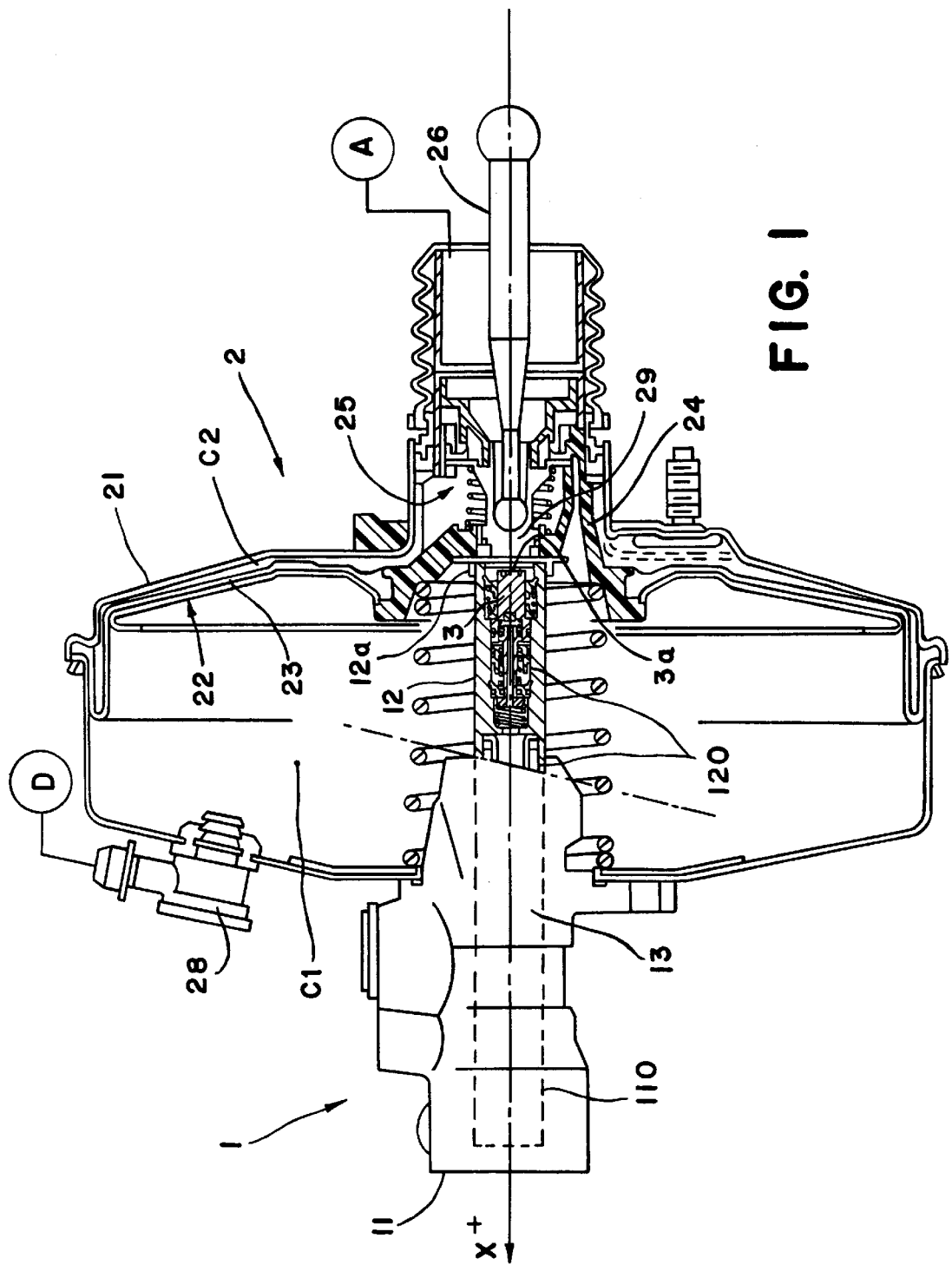
FIG. 1 is an overall sectional view of a booster incorporating the master cylinder of the invention.

In a way known per se, the pneumatic brake booster comprises (FIG. 1) a rigid casing 21, a moving partition 22 comprising a rigid skirt 23, a pneumatic piston 24, a three-way valve 25 and an operating rod 26 actuated by a brake pedal (not depicted).

The moving partition 22 divides the interior volume of the rigid casing 21 in leaktight fashion into two pneumatic chambers C1 and C2 of complementary and variable volume.

The first chamber, or front chamber C1 is connected to a low-pressure source D via a non-return valve 28, and the second chamber, or rear chamber C2 can be connected selectively, by means of the three-way valve 25, either to the low-pressure source D or to a relatively high-pressure source A, for example the atmosphere.

Thanks to this arrangement which is known per se, actuation of the three-way valve 25, which makes it possible to connect the rear chamber C2 to the second source A, causes a difference in pressure between the front and rear chambers C1 and C2, the moving partition 22 thus being urged by a force which represents the booster boost force and moving within the casing 21.

In practice, the three-way valve 25 is borne by the piston 24 and whether or not it opens to the rear chamber is controlled by the application of an actuating force in an axial direction X+ on the operating rod 26, this rod itself being borne by the piston 24 and ending in a feeler 29.

The master cylinder 1 is aligned with the operating rod 26 and essentially comprises a body 11 from which there project a main piston 12 and a reaction piston 3, this reaction piston forming part of hydraulic reaction means that will be detailed subsequently and are more specifically covered by the invention.

The body 11 is pierced with a main bore 110, in which the main piston 12, of cylindrical shape and pierced with a secondary bore 120 that may be stepped, is mounted so that it can slide, without leaking, in order therein to delimit a working chamber 13 which during operation is subject to a hydraulic pressure.

The end 12a of the main piston 12, which end is outside the body 11, has a part against which the pneumatic piston 24 can rest, so that it can receive the boost force transmitted to this pneumatic piston 24 by the moving partition 22 as a whole and directed in the axial direction X+.

Similarly, the end 3a of the reaction piston 3, which end is outside the body 11, has a part against which the feeler 29 can rest in order to receive the actuating force exerted by the driver in the axial direction X+ and transmitted through the operating rod 26.

The hydraulic-reaction means which more particularly form the subject-matter of the invention (FIG. 2) essentially comprise, in addition to the reaction piston 3, a shut-off seat 31, an annular wall 4, a ratio-change piston 5 and a floating piston 6.

The reaction piston 3 is mounted with leaktight sliding in a cross section S1 of a first diameter D1 of the secondary bore 120 which it closes off, and the shut-off seat 31 is mounted on a front face 32 of the reaction piston 3 on the side that points toward the working chamber 13.

The annular wall 4 which may form an integral part of the main piston 12 or be attached to allow easier manufacture, is arranged some distance from the reaction piston 3 in the direction X+, forms a fixed restriction for the secondary bore 120, and delimits a central passage 41.

More specifically, the central passage 41 has a second diameter D2 smaller than the first diameter D1 and makes the cross section S1 of first diameter D1 of the secondary bore 120 communicate with the working chamber 13.

The ratio-change piston 5 is tubular, open to the working chamber 13 and has a downstream external cross section 51 which passes with leaktight sliding through the central passage 41 of the annular wall 4.

The downstream external cross section 51 of the ratio-change piston 5 comprises a first retaining stop 52 that cooperates with the annular wall 4 on the same side as the working chamber 13.

Figure 2:
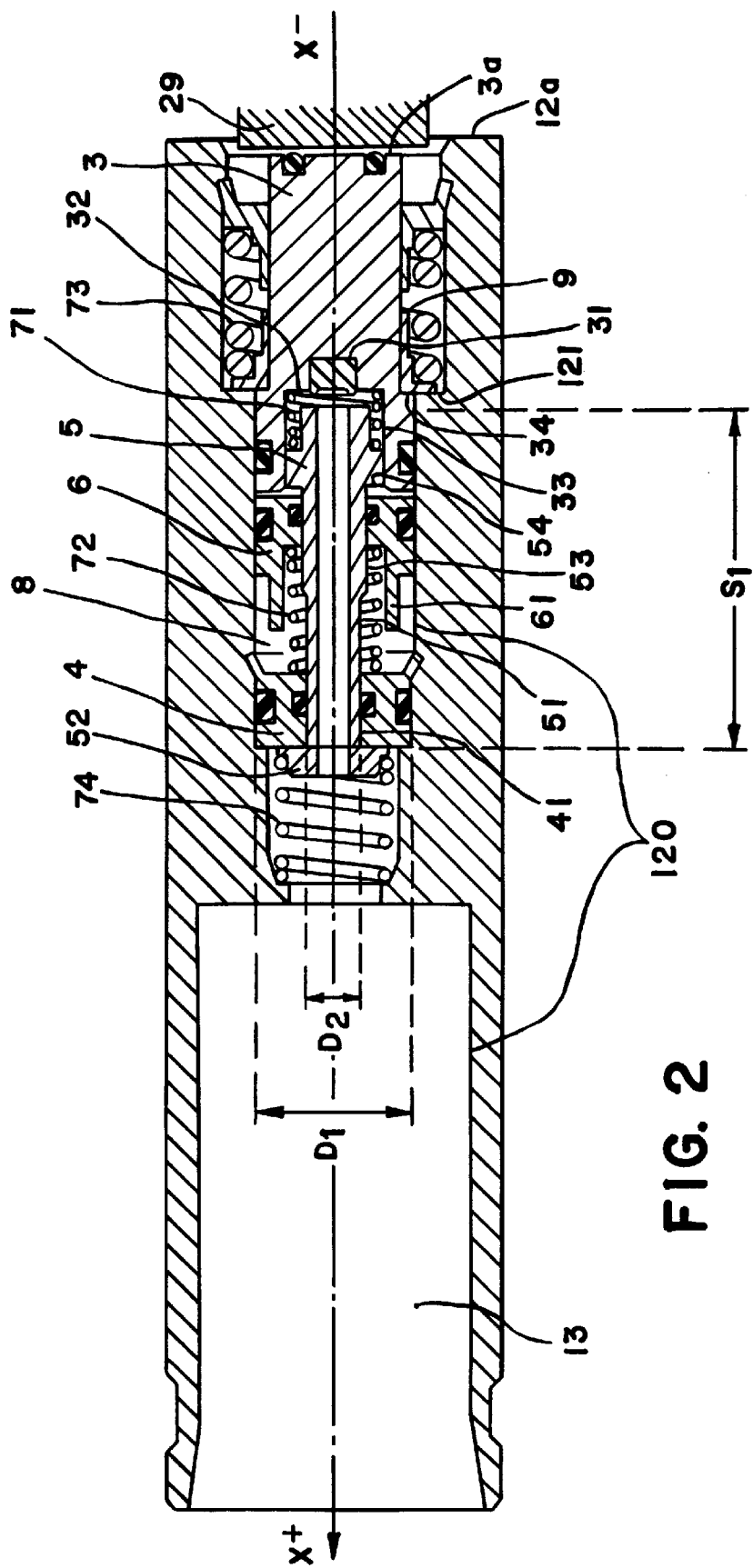
FIG. 2 is an enlarged sectional view of the part of the master cylinder in which the advantageous features of the invention.

A first spring 71 pushes the ratio-change piston 5 back some distance from the shut-off seat 31 so that the ratio-change piston 5 is moved off the shut-off seat 31 when the master cylinder is in a state of rest, which is the state depicted in FIG. 2, and so that the ratio-change piston 5 is shut off by the shut-off seat 31 for a condition in which the master cylinder is actuated quickly.

The floating piston 6 is annular and mounted with leaktight sliding both in the cross section S1 of first diameter of the secondary bore 120 and about an upstream external cross section 53 of the ratio-change piston 5.

In this way, the floating piston 6 and the annular wall 4 together delimit, in the axial direction X+, a low-pressure variable-volume annular chamber 8, for example full of air at atmospheric pressure, the compression of which is limited by means of rests 61 provided on the floating piston 6 and capable of coming up against the annular wall 4.

A second spring 72, housed in the annular chamber 8, urges the floating piston 6 in a direction X− which is the opposite of the first direction X+ and more precisely in the direction of the reaction piston 3 and of a second stop 54 provided on the ratio-change piston 5.

To provide the best possible guidance of the ratio-change piston 5, it is preferable for the latter to be mounted with non-leaktight sliding in a blind housing 33 of the reaction piston 3, in which the first spring 71 and the shut-off seat 31 are also arranged.

Furthermore, it is advantageous to provide a third spring 73 which urges a moving ring 9 in the direction X+ against an internal rest 121 of the secondary bore, the reaction piston 3 itself having a shoulder 34 for driving the ring along when it is displaced in the opposite direction X− from its position of rest depicted in FIG. 2.

Finally, it is also possible to provide a fourth spring 74 urging the first retaining stop 52 in the opposite direction X−, the downstream external cross section 51 of the ratio-change piston 5 then preferably having a diameter smaller than that of the upstream external cross section 53 of this ratio-change piston 5.

The way in which the master cylinder of the invention works is as follows.

If an actuating force that varies relatively slowly is applied to the operating rod 26, the driving-in of the feeler 29 causes the valve 25 to open, and therefore causes atmospheric air to be let into the rear chamber C2, before it has been possible for the ratio-change piston 5 to be closed off by the shut-off seat 31.

In these conditions, the moving partition 22 exerts on the end 12a of the main piston 12 a boost force which displaces the main piston in the direction X+ and which opposes any relative movement of the reaction piston 3 with respect to the main piston 12 in the direction X+, therefore prevents the reaction piston 3 from closing off the ratio-change piston 5 via the seat 31.

In this embodiment, the hydraulic pressure prevailing in the chamber 13 and which is exerted, by fluid flowing through the ratio-change piston 5, on the entire cross section of diameter D1 of the reaction piston 3, ends up, on the one hand, pushing back the floating piston 6, compressing the spring 72 and, on the other hand, pushing back the reaction piston 3 and the ring 9, compressing the spring 73, and thus causes a reaction force, the intensity of which is that of the reaction forces conventionally employed in known boosters, to appear on the feeler 29.

If an actuating force that varies relatively quickly is applied to the operating rod 26, then the reaction piston 3 will, by contrast, via its seat 31, close off the ratio-change piston 6 before atmospheric air can be let into the rear chamber C2 in sufficient quantity for the moving partition 22 to be able to exert on the end 12a of the main piston 12 a boost force that is capable of displacing the main piston in the direction S+ and of taking up the movement of the reaction piston 3.

In this operating mode, the hydraulic pressure that prevails in the working chamber 13 becomes no longer capable of being exerted on the cross section of diameter D1 of the reaction piston 3, on account of the ratio-change piston 5 being shut off, and can then be exerted only on the cross section of diameter D2 of the ratio-change piston 5, which is pressed against the reaction piston 3.

Now, insofar that the diameter D2 is smaller than the diameter D1, it is thus possible, according to the invention, considerably to reduce the reaction force that opposes the actuating force exerted on the reaction piston 3 in the event of quick application of this actuating force, and therefore to increase the actuating force available for emergency braking situations.

I claim:

1. Master cylinder with hydraulic reaction for a pneumatic brake booster, comprising:

a body pierced with a main bore;

a cylindrical main piston located without leaking, in said main bore to to delimit a working chamber which during operation is subjected to hydraulic pressure, said main piston having first end located outside of said body for receiving a boost force directed in a first direction and being pierced with a stepped secondary bore;

hydraulic reaction means including a reaction piston mounted with leaktight sliding in a cross section of a first diameter of the secondary bore which it closes off, and having an first end outside said body for receiving an actuating force, said boost force having a delay that increases with the rate of application of the actuating force;

characterized in that said hydraulic reaction means further comprise:

a shut-off seat mounted on a front face of said the reaction piston and pointing toward the working chamber;

an annular wall arranged some distance from said reaction piston in said first direction, said annular wall forming a reduced diameter of the secondary bore and delimiting a central passage which has a second diameter smaller than said first diameter of said secondary bore whereby the cross section of said first diameter of the secondary bore communicates with said working chamber;

a ratio-change piston which is tubular and open to said working chamber, said ratio-change piston having a downstream external cross section which passes with leaktight sliding through said central passage of said annular wall, said ratio-change piston having a first retaining stop which cooperation with said annular wall on a same side as said working chamber, said ratio-change piston being pushed back by a first spring some distance from said shut-off seat when said main piston is in a condition of rest, and by which it is closed off when said main piston is actuated quickly; and an annular floating piston mounted with leaktight sliding in said cross section of said first diameter of said secondary bore and around an upstream external cross section of said ration-change piston, said floating piston, together with said annular wall, delimiting a low-pressure annular chamber, a second spring being located in said lower-pressure annular chamber for urging said floating piston in a second direction that is opposite of said first direction and toward said reaction piston and a second stop of said ratio-change piston.

2. Master cylinder with hydraulic reaction according to claim 1, characterized in that the ratio-change piston is mounted with non-leaktight sliding in a blind bore of said reaction piston.

3. The master cylinder with hydraulic reaction according to claim 1, characterized in that said hydraulic reaction means includes a third spring for urging a moving ring in said first direction against an internal rest in said secondary bore, and in that said reaction piston has a shoulder capable of driving said ring along when it is shifted from a position of rest to said second direction.

4. The master cylinder with hydraulic reaction according to claim 1, characterized in that said hydraulic reaction means includes a fourth spring for urging said first retaining stop in said second direction, and in that said downstream external cross section and said upstream external cross section of the ratio-change piston have different respective diameters, said diameter of said downstream cross section being smaller than said diameter of said upstream cross section.

* * * * *